UNITED STATES PATENT OFFICE.

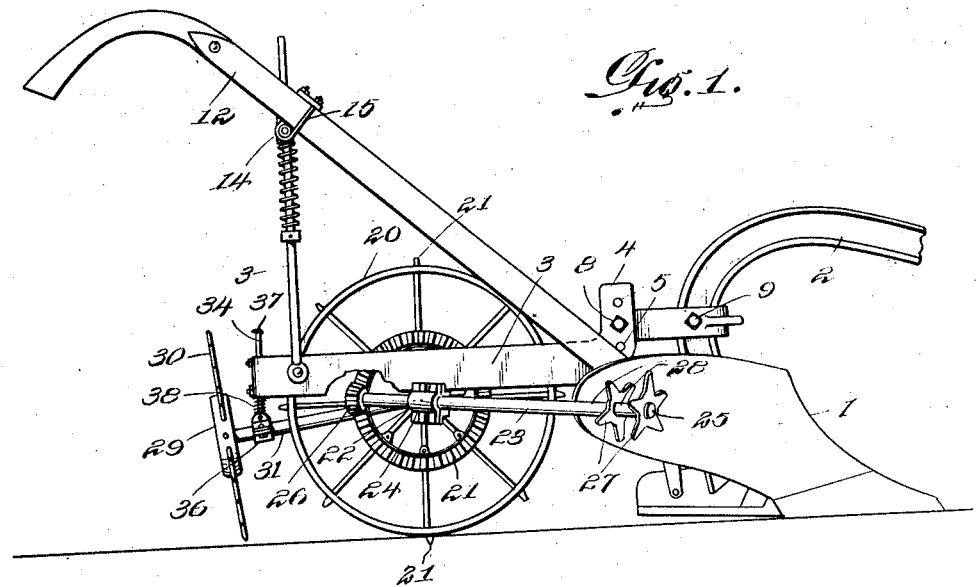

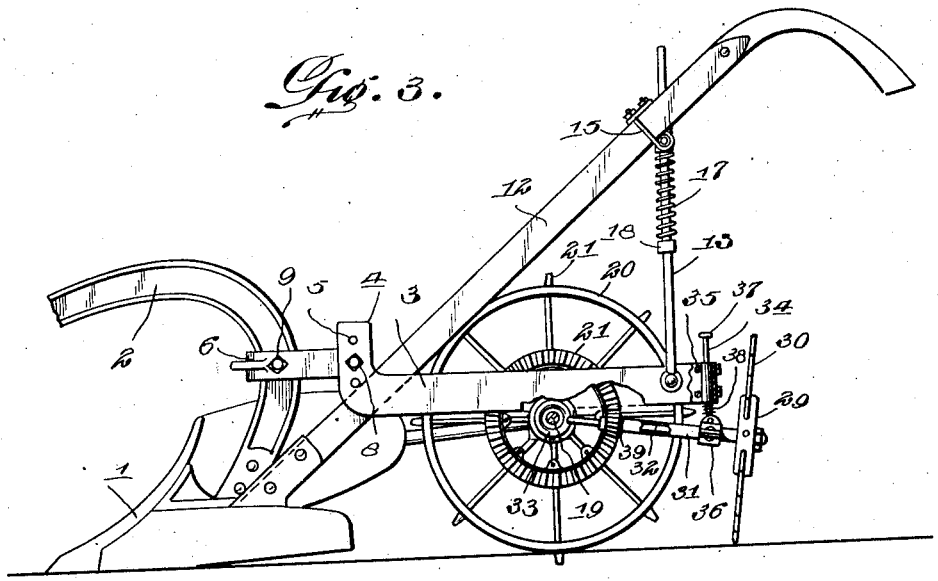

HUGH S. DALE, OF PICKENS, MISSISSIPPI.

ATTACHMENT FOR PLOWS.

1,355,737.  Specification of Letters Patent.  Patented Oct. 12, 1920.

Application filed June 24, 1919. Serial No. 306,299.

*To all whom it may concern:*

Be it known that I, HUGH S. DALE, a citizen of the United States, residing at Pickens, in the county of Holmes and State of Mississippi, have invented new and useful Improvements in Attachments for Plows, of which the following is a specification.

This invention relates to an improvement in plows, and particularly to an attachment designed for coöperation with the usual plow by the use of which the operator may break and lift the ground at one operation.

The improvement contemplates the provision of positive cutters arranged to coöperate with the earth turned over by the plow immediately following the plow operation, whereby the ground is effectively broken up simultaneously with the plow.

The improvement also contemplates the provision of means for cutting away the bank of earth left by the land side of the plow.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is an elevation of my invention attached to a plow;

Fig. 2 is a plan view of the same;

Fig. 3 is a view similar to Fig. 1, but looking toward the opposite side;

Fig. 4 is a rear view of the attachment;

Fig. 5 is a view of one of the cutter disks or wheels;

Fig. 6 is a detailed view of the means for attaching the device to the plow;

Fig. 7 is a sectional detail view showing one end of the wheel supporting shaft and its associated part.

In these views 1 indicates the plow which may be of any desired type and to the beam 2 of which my attachment is connected. The attachment consists of a substantially U-shape frame 3 with the ends of its legs bent upwardly at right angles as at 4, and these bent ends are provided with a plurality of holes 5. This frame is attached to the plow beam by means of the clevis 6 which is of U-shape with its legs engaging the cross bar 7 which is pivotally mounted in the bent upper ends 4 of the frame by the bolts 8. This clevis is clamped to the plow beam by the bolts 9. I prefer to connect the clevis with the cross bar 7 by splitting the ends of said clevis as shown at 10 in Fig. 6, and securing these split ends to the cross bar by means of the bolts 11. Thus it will be seen that the frame is pivotally and adjustably connected with the plow. The other end of the frame is adjustably connected to the handles 12 of the plow by means of the uprights 13 having their lower ends pivoted to the frame and their upper parts carrying the cross bar 14, which is connected with the handles by the U bolts 15. I prefer to yieldingly connect the uprights with the cross bar by providing couplings 16 slidably mounted on the uprights and resting upon the coiled spring 17 carried by the uprights. These springs rest upon the collars 18 on the uprights.

The frame 3 carries a shaft 19 on which is rotatably mounted a ground wheel 20, the peripheral surface of which has the usual spurs 21. Suitably secured to this wheel are the beveled gears 21. A socket head 22 is screwed to the projecting end of the shaft 19, on one side of the frame and a sleeve 23 is held in said socket by means of the socket cap 24 bolted to the socket head. A shaft 25 is journaled in said sleeve and one end of said shaft carries a pinion 26 which meshes with one of the gears 21 and the other end of the shaft carries a pair of star-shaped cutting wheels 27 which are spaced apart by a sleeve 28. As will be seen, the shaft and sleeve extend at an angle with the cutting wheels to one side and adjacent the upper edge of the mold board of the plow so that the earth leaving said mold board will come in contact with said cutting wheels and thus be pulverized by the same. By turning the socket head on the end of the shaft 23 the position of said cutter wheels may be adjusted in respect to the mold board.

The means for leveling the ridge of earth left by the land side of the plow consists of a wheel 29 provided with the sharp spikes 30 and this wheel is connected with a sleeve 31 mounted to rotate on a shaft 32. This shaft is formed with an eye 33 which encircles the end of the shaft 19 and is held thereon by a suitable nut 19'. The other end of the shaft is supported by a rod 34 which is slidably supported by a bracket 35 secured to one corner of the frame and the lower end of the rod is pivotally connected with a socket member 36 which encircles the sleeve 31. The upper end of the rod 34 is provided with a head 37 and a spring 38 is placed between the socket member and the bottom of the bracket and serves to yieldingly hold the spikes of the wheel in the earth. The sleeve 31 carries a beveled pinion 39 which engages with one of the gears 21 on the shaft 19. It will thus be seen that the spiked wheel 29 operates at right angles to the direction of movement of the plow and is so located that it will come in contact with the ridge of earth left by the land side so that this ridge will be leveled off. It will further be seen that both the ground wheel 20 and the spiked wheel are yieldingly held in contact with the ground by means of the springs 17 and 38 so that these wheels may adjust themselves to the unevenness of the ground.

The spiked wheel is more particularly adapted for cultivation of row crops as this wheel will cut out the weeds and grasses close to the rows without injuring the roots of the crops as would be the case if the plow was run close to the rows. This wheel may also be used for thinning the crops. It also acts to uncover small plants covered by the plow. When this wheel is not desired it may be easily detached so that the attachment may be used without the spiked wheel.

Having thus described the invention what is claimed as new is:

1. The combination of a plow, of a frame adapted to be located between the handles thereof, means for detachably securing the front end of the frame to the plow beam, means for yieldingly connecting the lower part of the frame with the handles, a ground wheel supported by said frame, a gear connected with said wheel, a forwardly extending shaft mounted in the frame, a pinion thereon engaging with the gear and cutters on the forward ends of said shaft for engaging the earth as it is being turned over by the plow.

2. The combination with a plow, of a frame located between the handles thereof, means for detachably connecting the forward end of said frame to the plow beam, yieldable means for connecting the rear end of the frame to the handles, a ground wheel carried by said frame, gears connected to said wheel, a forwardly extending shaft supported by the frame, a pinion on said shaft engaging with one of the gears, cutters on the forward end of the shaft, a rearwardly extending shaft mounted in the frame, a pinion thereon engaging with the other gear and a cutter wheel carried by said shaft.

3. The combination of a plow, of a frame detachably secured between the handles thereof, a ground wheel supported within said frame and adapted to engage the ground in the movement of the plow, a cutter shaft connected with said ground wheel to be rotated thereby, cutters on said shaft arranged to receive the earth turned over by the plow and means for adjusting the position of said cutters relative to the plow.

4. The combination of a plow, of a frame adjustably and pivotally secured thereto, a ground wheel supported within said frame and adapted to engage the ground in the movement of the plow, a sleeve carried by said frame, a shaft rotatably mounted in said sleeve, gears connecting the shaft with the wheel, cutters carried by the shaft and arranged to receive the earth turned over by the plow and means for adjustably supporting the sleeve on the frame.

In testimony whereof I affix my signature.

HUGH S. DALE.